(12) United States Patent
Kozaki

(10) Patent No.: US 11,054,847 B2
(45) Date of Patent: Jul. 6, 2021

(54) VALVE CONTROL APPARATUS AND VACUUM VALVE

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 79 days.

(21) Appl. No.: 16/738,051

(22) Filed: Jan. 9, 2020

(65) Prior Publication Data

US 2020/0272178 A1 Aug. 27, 2020

(30) Foreign Application Priority Data

Feb. 25, 2019 (JP) .............................. JP2019-031724

(51) Int. Cl.

| | |
|---|---|
| *G05D 16/02* | (2006.01) |
| *F16K 37/00* | (2006.01) |
| *G05D 16/20* | (2006.01) |
| *F16K 3/06* | (2006.01) |
| *F16K 51/02* | (2006.01) |
| *F16K 31/04* | (2006.01) |
| *F16K 3/02* | (2006.01) |
| *G05D 16/00* | (2006.01) |

(52) U.S. Cl.
CPC .............. *G05D 16/02* (2013.01); *F16K 3/06* (2013.01); *F16K 31/042* (2013.01); *F16K 37/005* (2013.01); *F16K 51/02* (2013.01); *G05D 16/202* (2013.01); *F16K 3/0254* (2013.01); *G05D 16/028* (2019.01); *G05D 16/2073* (2013.01)

(58) Field of Classification Search
CPC ........ F16K 36/005; F16K 3/0254; F16K 3/06; F16K 51/02; F16K 31/042; G05D 7/0623; G05D 16/02; G05D 16/202; Y10T 137/7761; Y10T 137/86083
USPC .................... 700/45, 282; 137/487.5, 565.23
See application file for complete search history.

(56) References Cited

U.S. PATENT DOCUMENTS

| | | | | |
|---|---|---|---|---|
| 5,549,137 A | * | 8/1996 | Lenz ...................... | G05D 7/005 137/486 |
| 5,979,480 A | * | 11/1999 | Hoshiko ............ | G05D 16/2046 137/14 |
| 6,041,814 A | * | 3/2000 | Kouketsu ............ | F16K 31/1221 137/488 |

(Continued)

FOREIGN PATENT DOCUMENTS

| | | |
|---|---|---|
| JP | 2018106718 A | 7/2018 |
| JP | 2018112933 A | 7/2018 |

*Primary Examiner* — William M Mccalister
(74) *Attorney, Agent, or Firm* — Renner, Otto, Boisselle & Sklar, LLP

(57) ABSTRACT

A valve control apparatus comprises: a generator configured to generate a first set pressure signal; and a valve opening controller configured to perform the first valve opening control on the basis of the target pressure and, after the first valve opening control, perform the second valve opening control performing feedback control on the basis of a difference between the first set pressure signal and the chamber pressure. The generator generates the first set pressure signal on the basis of a first set pressure locus converging from the chamber pressure at the time of switching from the first valve opening control to the second valve opening control to the target pressure with a predetermined time constant.

7 Claims, 11 Drawing Sheets

(56) References Cited

U.S. PATENT DOCUMENTS

| | | | | |
|---|---|---|---|---|
| 6,508,268 B1* | 1/2003 | Kouketsu | F16K 1/46 | 137/487.5 |
| 6,895,287 B2* | 5/2005 | Tanaka | G05B 11/32 | 700/19 |
| 7,381,650 B2* | 6/2008 | Johnson | G05D 16/2013 | 137/102 |
| 7,457,673 B2* | 11/2008 | Francis | G05B 5/01 | 700/28 |
| 8,666,556 B2* | 3/2014 | Agahi | G05B 13/0205 | 700/282 |
| 9,004,107 B2* | 4/2015 | Gregor | G05D 7/0664 | 137/884 |
| 2001/0053941 A1* | 12/2001 | Matsumoto | G05B 19/19 | 700/45 |
| 2005/0150559 A1* | 7/2005 | Kwon | F16K 3/32 | 137/630.12 |
| 2007/0219647 A1* | 9/2007 | Heertjes | G05B 19/371 | 700/44 |
| 2009/0005912 A1* | 1/2009 | Srivastava | G05B 13/044 | 700/276 |
| 2011/0054702 A1* | 3/2011 | Smirnov | G05D 7/0635 | 700/282 |
| 2011/0299943 A1* | 12/2011 | Woolever | B65G 53/66 | 406/14 |
| 2012/0204983 A1* | 8/2012 | Nozawa | C23C 16/511 | 137/565.01 |
| 2013/0025786 A1* | 1/2013 | Davidkovich | G05D 16/2046 | 156/345.26 |
| 2014/0130907 A1* | 5/2014 | Watanabe | G05D 16/024 | 137/487.5 |
| 2016/0189988 A1* | 6/2016 | Haga | A61L 2/14 | 137/1 |
| 2018/0196449 A1 | 7/2018 | Hirata | | |
| 2019/0196516 A1 | 6/2019 | Kozaki | | |

* cited by examiner

VALVE CONTROL APPARATUS AND VACUUM VALVE

BACKGROUND OF THE INVENTION

1. Technical Field

The present invention relates to a valve control apparatus and a vacuum valve.

2. Background Art

In order to automatically control a valve disc opening and quickly converge a chamber pressure to a target pressure, a valve apparatus described in Patent Literature 1 (JP-A-2018-106718) is configured in such a manner as to bring the pressure close to the target pressure with a coarse adjustment in open-loop control, and further drive the pressure to the target pressure with a fine adjustment by switching to closed-loop control. Moreover, as closed-loop control in the valve apparatus, such valve opening control that performs feedback control in such a manner as to converge a pressure error signal between a target pressure Ps and a detected chamber pressure Pr to zero as described in Patent Literature 2 (JP-A-2018-112933) is known.

SUMMARY OF THE INVENTION

If closed-loop control described in Patent Literature 2 is applied in closed-loop control after the switching in Patent Literature 1, when open-loop control is performed until coming close to the target pressure, and is then switched to closed-loop control, a difference Δ=|Pr−Ps| between the pressure Pr measured and the target pressure Ps is not zero. Accordingly, the pressure error signal of closed-loop control changes discontinuously and stepwise before and after the switching. As a result, a large overshoot may occur in closed-loop control to increase the pressure regulation time.

A valve control apparatus that performs first valve opening control and second valve opening control in succession on a vacuum valve between a vacuum chamber and a vacuum pump, and controls a chamber pressure of the vacuum chamber to a target pressure, the valve control apparatus comprises: a generator configured to generate a first set pressure signal; and a valve opening controller configured to perform the first valve opening control on the basis of the target pressure and, after the first valve opening control, perform the second valve opening control performing feedback control on the basis of a difference between the first set pressure signal and the chamber pressure. The generator generates the first set pressure signal on the basis of a first set pressure locus converging from the chamber pressure at the time of switching from the first valve opening control to the second valve opening control to the target pressure with a predetermined time constant.

The time constant is calculated on the basis of the chamber pressure at the time of the switching and a time derivative value of the chamber pressure, and the target pressure.

The generator corrects the time constant of the first set pressure locus every control period on the basis of a change in the first set pressure signal over time and a change in the chamber pressure over time, and generates a second set pressure signal on the basis of a second set pressure locus converging to the target pressure with the corrected time constant, and the valve opening controller performs third valve opening control performing feedback control, instead of the second valve opening control, on the basis of a difference between the second set pressure signal and the chamber pressure.

The corrected time constant is set to be less than the time constant before the correction upon the magnitude of the change in the first set pressure signal over time being less than the magnitude of the change in the chamber pressure over time, be greater than the time constant before the correction upon the magnitude of the change in the first set pressure signal over time being greater than the magnitude of the change in the chamber pressure over time, and be equal to the time constant before the correction upon the magnitude of the change in the first set pressure signal over time being equal to the magnitude of the change in the chamber pressure over time.

The time constant is calculated by an equation "$|(Ps-Pr0)|/|(dPr/dt|0|)|$" where the target pressure is Ps, the chamber pressure is Pr, and the chamber pressure at the time of the switching is Pr0.

The generator uses a time constant obtained by correcting the time constant on the basis of a control error in the first valve opening control, instead of the time constant, and generates the first set pressure signal on the basis of a set pressure locus converging to the target pressure with the corrected time constant.

A vacuum valve comprises: a disc; a disc driver configured to drive the disc to open and close the disc; and the valve control apparatus according to claim 1 configured to control the opening and closing drive by the disc driver.

According to the present invention, it is possible to quickly converge a chamber pressure to a target pressure after switching to feedback control.

DETAILED DESCRIPTION OF THE EXEMPLARY EMBODIMENTS

Hereinafter, preferred embodiments of the present invention will be described with reference to the drawings.

First Embodiment

Figure 1:
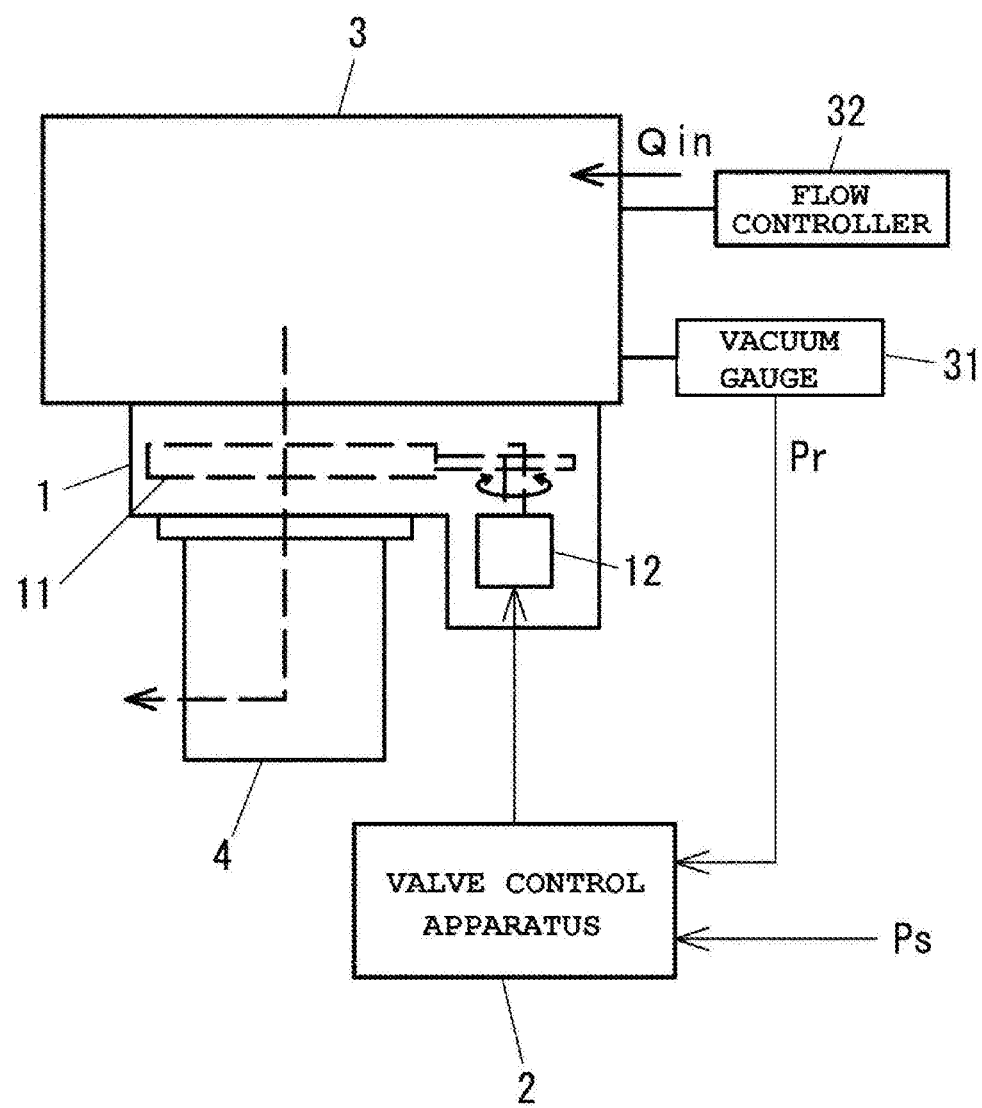
FIG. 1 is a schematic diagram of a vacuum apparatus provided with a valve control apparatus.

FIG. 1 is a diagram explaining a valve control apparatus of the present invention, and is a schematic diagram of a vacuum apparatus 100 including a vacuum valve 1 that is controlled by a valve control apparatus 2. The vacuum apparatus 100 is a semiconductor manufacturing apparatus such as a CVD apparatus, and includes a vacuum chamber 3 where semiconductor processes are performed. Air is evacuated from the vacuum chamber 3 by a vacuum pump 4 mounted thereon via the vacuum valve 1. The vacuum chamber 3 is provided with a vacuum gauge 31 that measures pressure in the chamber, and a flow controller 32 that controls a flow rate Qin of gas introduced into the vacuum chamber 3. The vacuum valve 1 is controlled by the valve control apparatus 2. For example, a turbomolecular pump is used as the vacuum pump 4.

The vacuum valve 1 includes a valve plate 11, and a valve motor 12 that drives the valve plate 11 to open and close it. The vacuum valve 1 is an automatic pressure regulator valve that adjusts a pressure Pr of the vacuum chamber 3 measured by the vacuum gauge 31 to a target pressure Ps inputted into the valve control apparatus 2, on the basis of the target pressure Ps and the pressure Pr of the vacuum chamber 3. The target pressure Ps is inputted from, for example, a controller (not illustrated) of the vacuum apparatus 100 into the valve control apparatus 2.

Figure 2:
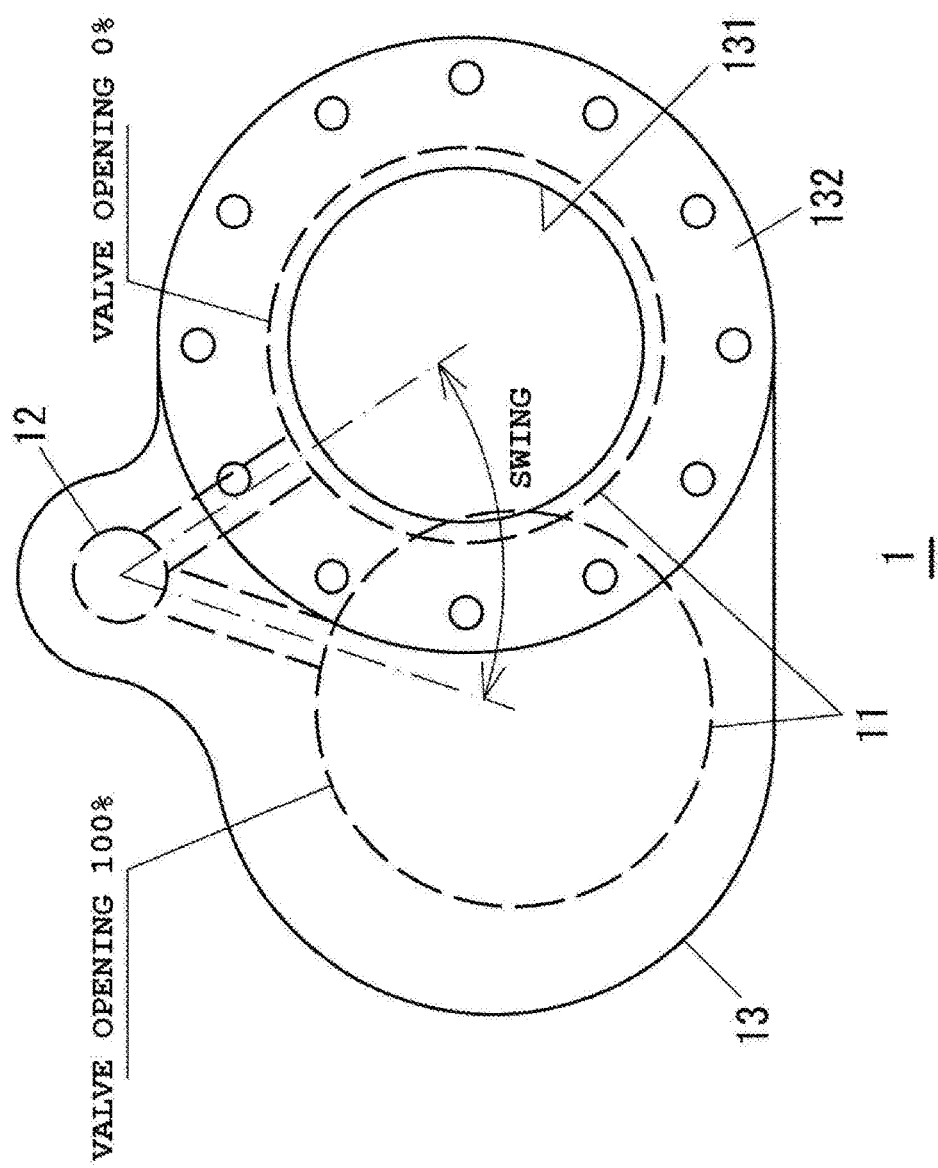
FIG. 2 is a diagram illustrating a suction port side of a vacuum valve.

FIG. 2 is a diagram illustrating a suction port side of the vacuum valve 1. The valve plate 11 is housed in a valve body 13 of the vacuum valve 1. A suction port flange 132 including an opening 131 is provided on the suction side of the valve body 13. An exhaust port flange (not illustrated) to which the vacuum pump 4 is attached is provided on an exhaust side (a side opposite to the suction side) of the valve body 13 coaxially with the suction port flange 132. When the valve motor 12 is driven and rotated in the normal and reverse directions to drive and swing the valve plate 11, the valve plate 11 slides in the horizontal direction to perform the operation of opening and closing the valve. The valve plate 11 is driven to be opened and closed between a position at a valve opening of 0% where the valve plate 11 faces the entire opening 131 and a position at a valve opening of 100% where the valve plate 11 is retracted from the opening 131.

Valve Control Apparatus 2

Figure 3:
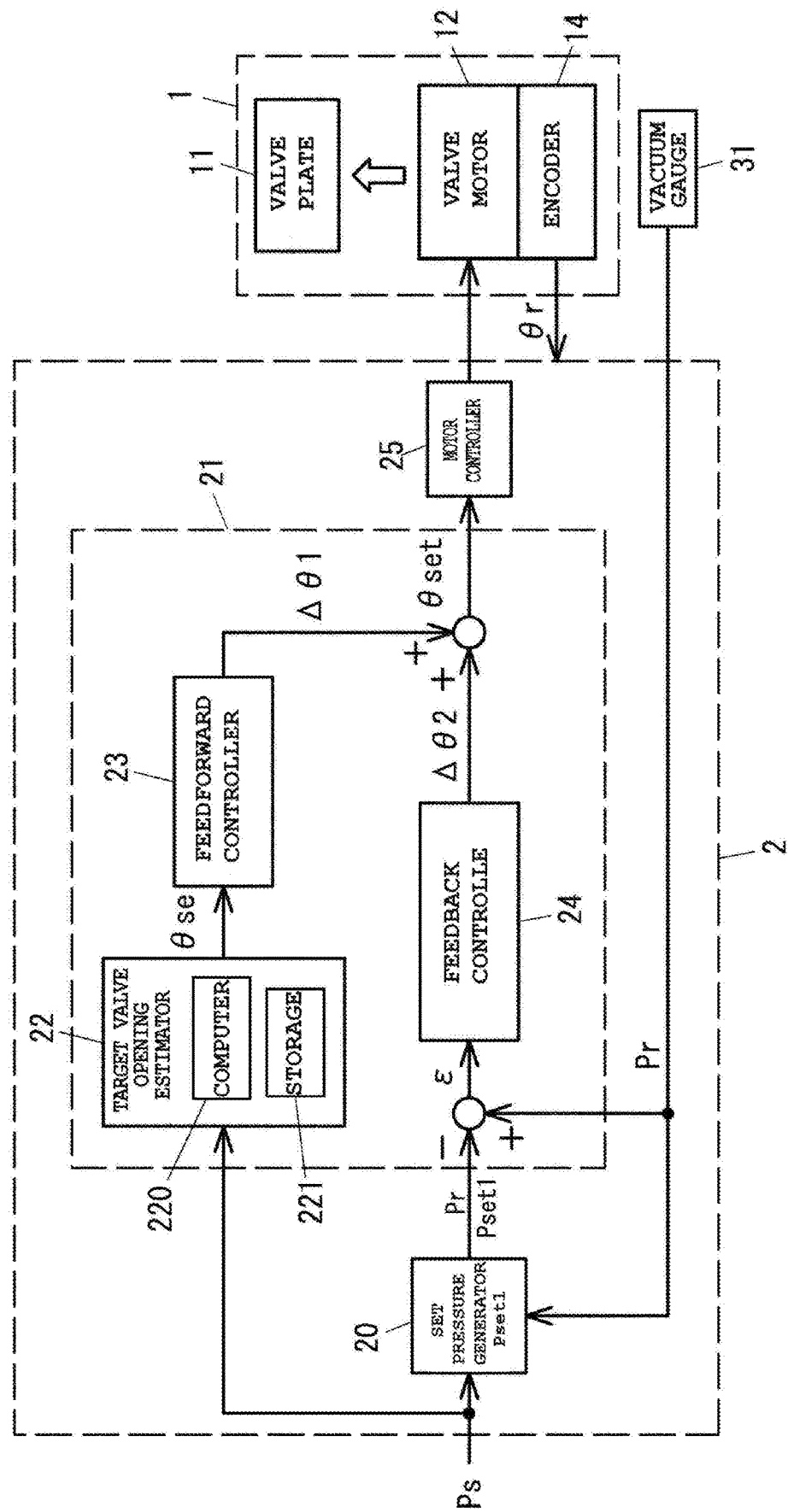
FIG. 3 is a block diagram illustrating the configurations of the vacuum valve and the valve control apparatus.

FIG. 3 is a block diagram illustrating the configurations of the vacuum valve 1 and the valve control apparatus 2. The valve motor 12 of the vacuum valve 1 is provided with an encoder 14 for detecting the valve opening of the valve plate 11. A detection signal (hereinafter simply referred to as the valve opening $\theta r$) of the encoder 14 and the pressure Pr of the vacuum chamber 3 measured by the vacuum gauge 31 are inputted into the valve control apparatus 2.

The valve control apparatus 2 includes a set pressure generator 20, a valve opening controller 21, and a motor controller 25. The valve opening controller 21 includes a target valve opening estimator 22, a feedforward controller 23, and a feedback controller 24. The valve control apparatus 2 executes first valve opening control to rapidly make a coarse adjustment to the valve opening of the valve plate 11 in the first stage of valve opening control, and second valve opening control to make a fine adjustment to the valve opening with high accuracy in the second stage of the valve opening control after the first valve opening control.

In the embodiment, open-loop control based on the target pressure Ps is performed as the first valve opening control by the feedforward controller 23. Closed-loop control based on a pressure deviation $\varepsilon$ being a difference between the pressure Pr and a set pressure Pset1 generated by the set pressure generator 20 is performed as the second valve opening control by the feedback controller 24. A valve opening setting output $\Delta\theta 1$ from the feedforward controller 23 and a valve opening setting output $\Delta\theta 2$ from the feedback controller 24 are added to be inputted as a valve opening setting output $\theta set$ into the motor controller 25. The motor controller 25 controls and drives the valve motor 12 on the basis of the valve opening setting output $\theta set$.

A correlation between a valve opening $\theta$ and a pressure P is stored in a storage 221 of the target valve opening estimator 22. A computer 220 of the target valve opening estimator 22 computes and estimates an estimated target valve opening value $\theta se$ on the basis of the target pressure Ps and the correlation. A method for computing and estimating the estimated target valve opening value $\theta se$ is described below. The feedforward controller 23 outputs the valve opening setting output $\Delta\theta 1$ on the basis of the estimated target valve opening value $\theta se$ computed and estimated by the target valve opening estimator 22. In this manner, in open-loop control, the estimated target valve opening value $\theta se$ at which the target pressure Ps is attained is obtained separately, and the setting of the valve opening is outputted through a path decided appropriately to attain the estimated target valve opening value $\theta se$ in the end. When the valve opening $\theta r$ reaches the estimated target valve opening value $\theta se$ in the end in open-loop control, the valve opening control switches from open-loop control to closed-loop control while the valve opening setting output $\Delta\theta 1$ outputted from the feedforward controller 23 is fixed at the estimated target valve opening value $\theta se$.

The set pressure generator 20 generates a set pressure used to calculate the pressure deviation $\varepsilon$ on the basis of the target pressure Ps and the pressure Pr inputted from the vacuum gauge 31. In open-loop control in the first stage of the valve opening control, the pressure Pr is outputted as the set pressure from the set pressure generator 20. In closed-loop control, the set pressure generator 20 computes and estimates a set pressure locus on the basis of a pressure Pr0 at the timing when open-loop control is switched to closed-loop control, and the target pressure Ps, and outputs the set pressure Pset1 based on the set pressure locus. A method for calculating the set pressure Pset1 is described in detail below.

The feedback controller 24 outputs the valve opening setting output $\Delta\theta 2$ based on the pressure deviation $\varepsilon=Pr-$(the set pressure). The feedback controller 24 normally includes proportional and integral gains (what is called PI gains). As described above, in open-loop control, the pressure Pr is outputted as the set pressure from the set pressure generator 20. Accordingly, the pressure deviation $\varepsilon=0$ is inputted into the feedback controller 24. $\Delta\theta 2=0$ is outputted from the feedback controller 24. On the other hand, when the valve opening setting output $\Delta\theta 1$ outputted from the feedforward controller 23 is fixed at the estimated target valve opening value $\theta se$ and open-loop control is switched to closed-loop control, the set pressure generator 20 outputs the set pressure Pset1. As a result, the pressure deviation $\varepsilon=Pr-Pset1$ is inputted into the feedback controller 24, and the feedback controller 24 outputs the valve opening setting output $\Delta\theta2$ on the basis of the pressure deviation $\varepsilon$. The motor controller 25 controls the valve opening on the basis of the valve opening setting output $\theta set = \Delta\theta1$ (fixed)$+\Delta\theta2$.

Example of Correlation

As described above, the computer 220 of the target valve opening estimator 22 computes and estimates the estimated target valve opening value $\theta se$ on the basis of the correlation between the valve opening stored in the storage 221 and the pressure of the vacuum chamber 3, and the inputted target pressure Ps. A case where a plant gain Gp defined by the following equation (1) is used as the correlation between the valve opening $\theta$ and the pressure P is described here as an example. As can be seen from equation (1), the plant gain Gp represents the pressure response characteristics to the change of the valve opening $\theta$. $|(\Delta P/\Delta\theta)|$ indicates the absolute value of $(\Delta P/\Delta\theta)$.

$$Gp=|(\Delta P/\Delta\theta)|/P \qquad (1)$$

Assume that the valve opening is the input and the pressure of the vacuum chamber 3 is the output. In this case, the quantity $((\Delta P/\Delta\theta)/P)$ obtained by normalizing the change of the pressure for the change of the valve opening, that is, $(\Delta P/\Delta\theta)$ by the pressure P represents a static gain characteristic of the pressure response of lean gas in the vacuum chamber 3 being a plant. The absolute value $|(\Delta P/\Delta\theta)|/P$ of $(\Delta P/\Delta\theta)/P$ of $(\Delta P/\Delta\theta)/P$ is referred to as the plant gain Gp here. The plant gain Gp expressed by equation (1) can also be considered to be the quantity obtained by differentiating a logarithmic value ($Log_e P(\theta)$) of the pressure $P(\theta)$ with respect to the valve opening $\theta$.

The plant gain Gp is a characteristic of a system including the vacuum valve 1, the vacuum chamber 3, and the vacuum pump 4. Even if the vacuum valve 1 is the same, the plant gain Gp varies slightly if the vacuum chamber 3 and the vacuum pump 4 are different.

An effective pumping speed Se of the vacuum chamber 3 is generally used to control the valve opening of the vacuum valve 1. When the vacuum valve 1 is used, mounted on the vacuum chamber 3, an initial calibration operation related to the effective pumping speed Se, that is, an initial calibration operation related to valve control is normally performed. The gain of a controller is generally calibrated in accordance with the volume of the vacuum chamber 3, the sensitivity of the valve plate 11, and the like with a typical gas of a process condition applied or under average gas conditions (a gas type and a gas flow rate). For example, an average molecular weight of mixed gas is obtained, and a gas type that can be relatively easily handled is used for the average condition in many cases.

An initial value (data table) of the plant gain Gp is stored in the storage 221. However, an initial calibration is also required for the plant gain Gp as in the known case of control using the effective pumping speed Se. The initial calibration allows obtaining a plant gain Gpi at each valve opening $\theta i$ in predetermined specific gas type and flow rate value conditions. The storage 221 is caused to store the obtained data table ($\theta i$, Gpi) as the calibrated plant gain Gp.

Calculation of Estimated Target Valve Opening Value $\theta se$

Next, an example of the method for calculating the estimated target valve opening value $\theta se$ is described. Here, the current pressure regulation state ($\theta$, P) is expressed as ($\theta0$, P0), and the next pressure regulation state to shift to is expressed as ($\theta1$, P1). As described above, the data table ($\theta$, Gp) representing the relationship between the valve opening $\theta$ and the plant gain Gp is stored in the storage 221. In other words, the plant gain Gp can be expressed as a function $Gp(\theta)$ of the valve opening $\theta$. When the definition equation of equation (1) is used, the relationship between the valve opening change $\Delta\theta$ and the pressure change $\Delta P$ is expressed as in equation (2). The pressure P decreases with increasing valve opening $\theta$. Accordingly, the minus sign is assigned to the right side of equation (2).

$$\Delta P = -P \times Gp(\theta) \times \Delta\theta \qquad (2)$$

The relationship between the current pressure regulation state ($\theta0$, P0) and the next pressure regulation state ($\theta1$, P1) can be expressed by the following equations (3) and (4).

$$\theta1=\theta0+\int d\theta \text{ (the integration range is from } \theta0 \text{ to } \theta1\text{)} \qquad (3)$$

$$P1=P0+\int dP \text{ (the integration range is from } P0 \text{ to } P1\text{)} \qquad (4)$$

In reality, the integrals of equations (3) and (4) are expressed as an addition of the increment $\Delta\theta$ of the valve opening and the increment $\Delta P$ of the pressure in each quasistatic state from the pressure regulation state ($\theta0$, P0) to the pressure regulation state ($\theta1$, P1). Accordingly, $\theta1$ and P1 can be expressed as in the following equations (5) and (6). $\Delta\theta\_n(\theta\_n)$ in equation (5) represents an increment $\Delta\theta\_n$ of the valve opening at a valve opening $\theta\_n$. For example, $\Delta\theta\_1(\theta\_1)$ is an increment of the valve opening when the valve opening changes from a valve opening $\theta0$ to a valve opening $\theta\_1$. $\Delta P\_n(p\_n)$ represents an increment of the pressure at a pressure P_n likewise.

$$\theta1=\theta0+\Sigma\Delta\theta\_n(\theta\_n) \qquad (5)$$

$$P1=P0+\Sigma\Delta P\_n(P\_n) \qquad (6)$$

In terms of $\Delta\theta\_n(\theta\_n)$ of equation (5), it is simply required to give the increment $\Delta\theta\_n(\theta\_n)$ in accordance with each valve opening $\theta\_n$ as in equation (7). In terms of $\Delta P\_n(P\_n)$ of equation (6), it is simply required to give the increment $\Delta P\_n(P\_n)$ at the pressure P_n corresponding to the increment $\Delta\theta\_n(\theta\_n)$ at the valve opening $\theta\_n$, using the correlation between the valve opening $\theta$ and the pressure P. If the plant gain Gp is used as the correlation, the increment $\Delta P\_n=\Delta P\_n(P\_n)$ at the pressure P_n is expressed as in the following equation (8), applying the above-mentioned equation (2). In equation (8), $\Delta\theta\_n=\Delta\theta\_n(\theta\_n)$, and $Gp\_n=Gp(\theta\_n)$.

$$\Delta\theta\_n=\Delta\theta\_n(\theta\_n) \qquad (7)$$

$$\Delta P\_n=\Delta P\_n(P\_n)=-P\_n \times Gp\_n \times \Delta\theta\_n \qquad (8)$$

When equations (7) and (8) are substituted into equations (5) and (6) to compute a cumulative sum, it is possible to reach approximately the valve opening value $\theta1$ and the pressure value P1 in the pressure regulation state ($\theta1$, P1). Moreover, when equations (5) and (6) are modified and expressed as described below, it is possible to sequentially perform computations.

$$\theta\_n+1=\theta\_n+\Delta\theta\_n \qquad (9)$$

$$P\_n+1=P\_n+\Delta P\_n \qquad (10)$$

If the target pressure Ps is inputted as the next pressure regulation condition into the valve control apparatus 2 in the current pressure regulation state ($\theta0$, P0), at least whether the next target pressure is higher or lower than the current target pressure at this point in time is determined. Therefore, if the next target pressure Ps is higher (Ps=P1>P0), as long as there is no extreme change in flow rate, the disc driving direction is a direction in which the valve opening is reduced as compared to the current valve opening. Conversely, if the next target pressure Ps is lower (Ps=P1<P0), the disc driving direction is a direction in which the valve opening is increased as compared to the current valve opening. In other words, if the next pressure regulation condition (the target pressure Ps) is inputted into the valve control apparatus 2, it is possible to determine the direction in which the increment of the valve opening is monotonously increased or reduced from the current pressure regulation state (θ0, P0).

If the computation processing capability of the target valve opening estimator 22 is high, the value of $\Delta\theta\_n$ in equation (7) is set at a minute quantity as much as possible to increase the computational accuracy. For example, $\Delta\theta\_n$ is set at 0.1% or below for 100% full valve opening. A cumulative sum of the valve opening θ is computed from equations (7) and (9) in monotone increments of +0.1% or −0.1% from the pressure regulation state (θ0, P0). A cumulative sum of the pressure P is sequentially computed from equations (8) and (10). If the value "P0+ΣΔP_n(P_n)" on the right side of equation (6) being the computed cumulative pressure value reaches (or exceeds) the next pressure value (the target pressure value) P1, the computation ends. The cumulative valve opening computed when the value has reached the pressure value P1 corresponds to the estimated target valve opening value θse. The example of the method for calculating the estimated target valve opening value θse is described above. However, the plant gain is also the quantity obtained by differentiating the logarithmic value of the pressure with respect to the valve opening as described above. Therefore, although the details are not described, it also is possible to obtain the estimated target valve opening value θse, applying a logarithmic computation or an exponential computation.

Operation of Adjusting Valve Opening

Figure 4:
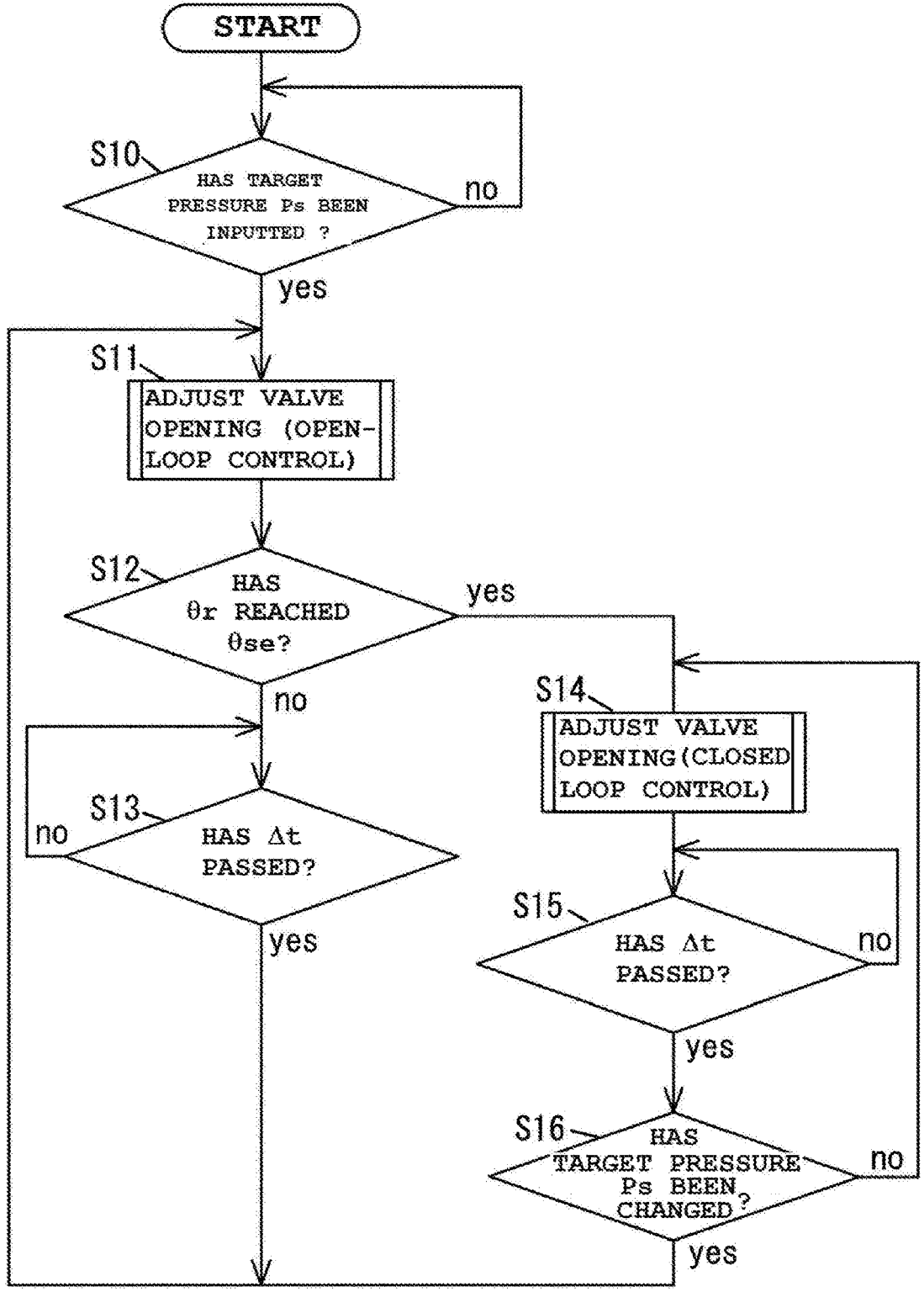
FIG. 4 is a flowchart explaining the operation of adjusting the valve opening in the embodiment.

FIG. 4 is a flowchart explaining the operation of adjusting the valve opening in the embodiment. In step S10, it is determined whether or not the target pressure Ps has been inputted into the valve control apparatus 2. If the target pressure Ps has been inputted, execution proceeds to step S11. In step S11, the valve opening is adjusted in open-loop control. In other words, the pressure Pr is outputted from the set pressure generator 20, and the valve opening setting output Δθ2 of the feedback controller 24 becomes Δθ2=0, and the valve opening is controlled on the basis of the valve opening setting output Δθ1 outputted from the feedforward controller 23.

In step S12, it is determined whether or not the valve opening θr has reached the estimated target valve opening value θse. If not, execution proceeds to step S13. If so, execution proceeds to step S14. In step S13, it is determined whether or not a predetermined time Δt being the control period (the sampling period) has passed. If it is determined the time has passed, execution returns to step S11.

On the other hand, if it is determined in step S12 that the valve opening θr has reached the estimated target valve opening value θse to proceed to step S14, open-loop control ends in a state where the valve opening is fixed at the estimated target valve opening value θse. The valve opening is then adjusted in closed-loop control in step S14. In other words, the pressure deviation ε=Pr−Pset1 between the set pressure Pset1 and the pressure Pr, which have been outputted from the set pressure generator 20, is inputted into the feedback controller 24. The valve opening is controlled on the basis of the valve opening setting output Δθ2 outputted from the feedback controller 24.

In step S15, it is determined whether or not the predetermined time Δt being the control period (the sampling period) has passed. If it is determined that the time has passed, execution proceeds to step S16. In step S16, it is determined whether or not the target pressure Ps has been changed. If the target pressure Ps has been changed, execution returns from step S15 to step S11. The adjustment of the valve opening in open-loop control starts again. On the other hand, if the target pressure Ps has not been changed, execution returns to step S14 to continue closed-loop control.

Comparative Example

The respect that in closed-loop control in the embodiment, the set pressure generator 20 generates the set pressure Pset1 to perform feedback control on the basis of the pressure deviation ε=Pr−Pset1 between the set pressure Pset1 and the pressure Pr is different from before. In conventional closed-loop control, the valve opening is controlled on the basis of a difference between the target pressure Ps and the measured pressure Pr as described in, for example, FIG. 3 in JP-A-2018-12263. This corresponds to that the set pressure generator 20 of FIG. 3 outputs not the set pressure Pset1 of the embodiment but the target pressure Ps.

Figure 5A:
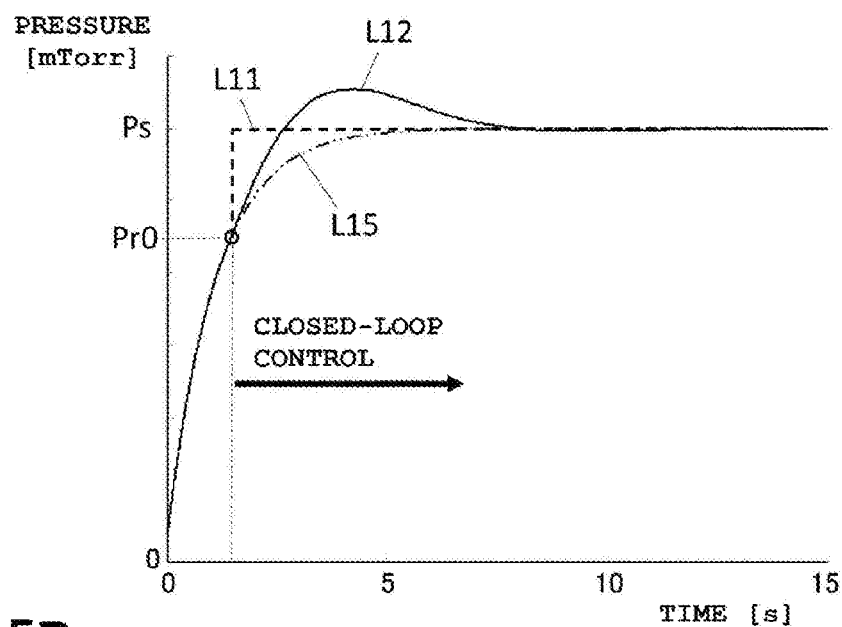
FIGS. 5A and 5B are diagrams illustrating examples of a pressure response and a valve opening output in a comparative example.
Figure 5B:
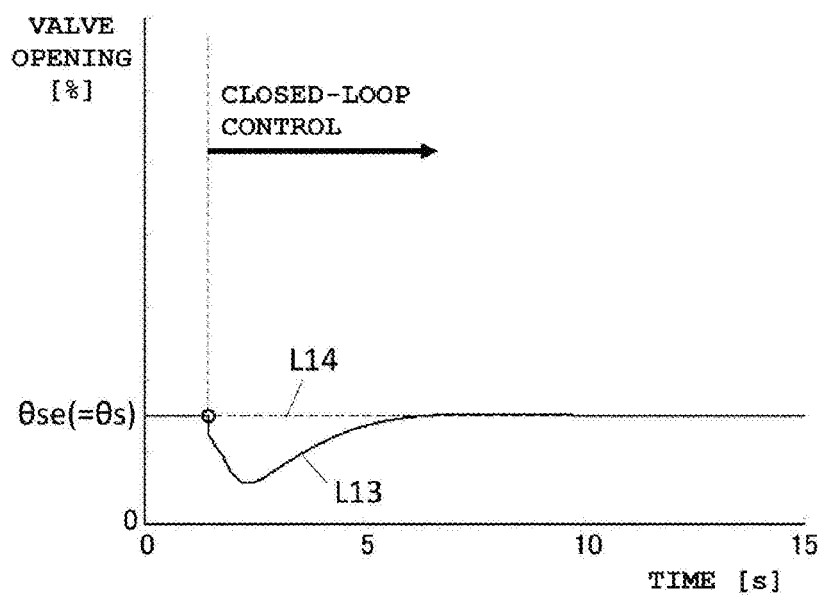

FIGS. 5A and 5B are diagrams explaining a comparative example of the present invention. In the comparative example, closed-loop control starts on the basis of the difference between the target pressure Ps and the measured pressure Pr when open-loop control is switched to closed-loop control. FIG. 5A illustrates an example of a pressure response. FIG. 5B illustrates a valve opening output (θr) at this point in time. Also in the case of the comparative example, when open-loop control ends, the valve opening θr is fixed at the estimated target valve opening value θse being the final value of Δθ1. The control proceeds to start closed-loop control. Hence, the set pressure outputted from the set pressure generator 20 is changed from the pressure Pr0 immediately before the start of closed-loop control to the target pressure Ps. Accordingly, the pressure deviation ε that has been zero up to this point increases suddenly immediately after the start of closed-loop control, and the valve opening θr deviates from the estimated target valve opening value θse.

FIGS. 5A and 5B illustrate a case where the accuracy of the estimated target valve opening value θse is very high, and illustrates a case where the estimated target valve opening value θse is equal to the target valve opening θs (the valve opening at which the target pressure Ps is attained). Even in such a case, the set pressure changes stepwise from Pr0 to Pset as in line L11 when open-loop control is switched to closed-loop control. Accordingly, there is a drawback that a large overshoot occurs on a pressure response (line L12) and the pressure regulation time increases. The pressure deviation ε increases suddenly from zero immediately after the start of closed-loop control. Accordingly, the valve opening θr indicated by line L13 in FIG. 5B reduces once immediately after the start of closed-loop control, and then returns gradually to the estimated target valve opening value θse (=θs).

In the embodiment, the set pressure Pset1 outputted from the set pressure generator 20 is set at a set pressure described below. Accordingly, the occurrence of, for example, an overshoot illustrated in FIG. 5A is prevented to encourage a reduction in pressure regulation time.

Method for Calculating Set Pressure Pset1

If the vacuum apparatus 100 is, for example, an apparatus that performs semiconductor processes, many pressure regulation events are performed in which various process conditions including different gas types, flow rates, and target pressures Ps of gas introduced into the vacuum chamber 3 are switched and changed every predetermined time. In each pressure regulation event, the flow rate is converged by the flow controller 32 to a predetermined flow rate value immediately after the start, and concurrently, the valve opening of the vacuum valve 1 is adjusted and the effective pumping speed of the exhaust system is controlled. Accordingly, the pressure Pr of the vacuum chamber 3 converges to the target pressure Ps. An equation of the exhaust indicated by the following equation (11) holds for the pressure Pr of the vacuum chamber 3. In equation (11), V denotes the volume of the vacuum chamber 3, Se denotes the effective pumping speed of the exhaust system including conductance of the vacuum valve 1, and Qin denotes the flow rate of gas introduced into the vacuum chamber 3.

$$V \times (dPr/dt) + Se \times Pr = Qin \quad (11)$$

In a general process, the timing when the flow controller 32 completes the control and convergence of the flow rate is earlier than the timing when the vacuum valve 1 completes the control and convergence of the pressure. Hence, it can be considered that at the timing when closed-loop control starts, the flow rate Qin of gas introduced has already converged to a predetermined flow rate Qin0. Moreover, before the start of closed-loop control, the valve opening θr is fixed at the final valve opening value (the estimated target valve opening value θse) of open-loop control. Accordingly, it can be considered that the effective pumping speed Se has also reached a fixed value Se0 at the timing when closed-loop control starts.

In open-loop control, the valve opening θr is controlled to the final valve opening value (the estimated target valve opening value θse) that brings the pressure Pr close to the target pressure Ps. The above Se0 is the effective pumping speed at the valve opening value θse. The correlation between the valve opening θ and the effective pumping speed Se is stored in advance in the storage 221 (refer to FIG. 3). The pressure Pr has reached the target pressure Ps, and the effective pumping speed at this point in time is regarded as approximately Se0 on the basis of the above description. Accordingly, the flow rate is expressed as an integral, Ps×Se0, of them. Hence, the flow rate Qin0 at the timing when closed-loop control starts can also be regarded as approximately Qin0=Ps×Se0.

On the other hand, equation (11) of the exhaust at the timing when closed-loop control starts is expressed as in equation (12). In equation (12), "dPr/dt|0" is the value of a time derivative "dPr/dt" of the pressure at the timing when closed-loop control starts.

$$V \times (dPr/dt|0) + Se0 \times Pr0 = Qin0 \quad (12)$$

When Qin0=Ps×Se0 is applied to equation (12), the following equation (13) is obtained.

$$V/Se0 = (Ps - Pr0)/(dPr/dt|0) \quad (13)$$

The left side=V/Se0 of equation (13) is a time constant τ0 at the timing when closed-loop control starts. In other words, the time constant τ0 can be calculated by the following equation (14), using the pressure Pr (=Pr0) at the timing when closed-loop control starts and the time derivative value (dPr/dt|0) of the pressure. The time derivative value (dPr/dt|0) of the pressure can be calculated by ΔPr/Δt, using the pressure difference (ΔPr) during the control period Δt.

$$\tau 0 = (Ps - Pr0)/(dPr/dt|0) \quad (14)$$

The time derivative value (dPr/dt) of the pressure receives a large influence of noise. Accordingly, it is better to perform the smoothing process (filtering such as a moving average) in accordance with the level of noise mixed in a detection signal. As described above, the use of equation (14) allows calculating the time constant τ0 irrespective of the gas type and the flow rate that are unknown on the valve control apparatus 2 side.

Here, a case is considered in which in FIGS. 5A and 5B, closed-loop control is not started after the valve opening θr is controlled to the final valve opening value (the estimated target valve opening value θse) of open-loop control, and the valve opening θr is maintained at the estimated target valve opening value θse as in line L14 of FIG. 5B. In this case, the pressure Pr of the vacuum chamber 3 rises from Pr0 with the above-mentioned time constant τ0. It is assumed that the estimated target valve opening value θse agrees with the target valve opening θs. Accordingly, the pressure Pr converges to the target pressure Ps as in line L15 of FIG. 5A. A pressure response Pr open at this point in time is expressed by the following equation (15). In the following equation (15), Qin0=Ps×Se0 is used.

$$Pr\_open = Pr0 \exp(-t/\tau 0) + (Qin0/Se0)[1 - \exp(-t/\tau 0)] = \quad (15)$$
$$Pr0 \exp(-t/\tau 0) + Ps[1 - \exp(-t/\tau 0)]$$

Equation (15) is a pressure response that converges to the target pressure Ps only with open-loop control without closed-loop control if the estimated target valve opening value θse is calculated without an error and agrees with the ideal target pressure Ps. In other words, equation (15) can be interpreted as an optimal value as the set pressure Pset1 that does not cause an unnecessary pressure deviation in closed-loop control. In the embodiment, line L15 of FIG. 5A is adopted for the set pressure locus of when the set pressure Pset1 is generated. The actual signal is a discrete signal and accordingly, is expressed by such a recurrence relation as equation (16). Let the timing when closed-loop control starts be i=1. i is incremented by +1 with the progress of the control period Δt. Pset_0=Pr0.

$$Pset1\_i = A \times Pset\_i-1 + Ps \times (1-A) \text{ for } i \geq 1 \quad (16)$$

where $\Delta = \exp(-\Delta t/\tau 0)$

Figure 6A:
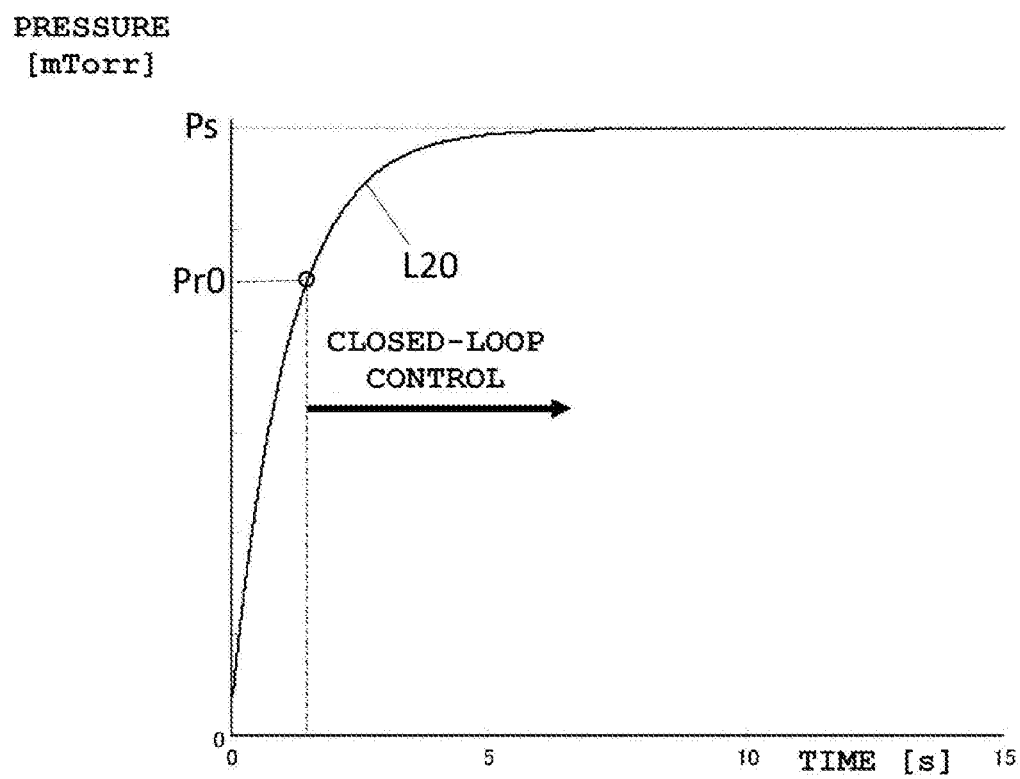
FIGS. 6A and 6B are diagrams illustrating a pressure response and a valve opening output in a case where a set pressure of a first embodiment is applied.

Line L20 of FIG. 6A is a diagram illustrating a pressure response of when the set pressure generator 20 outputs the set pressure Pset1_i indicated by the above-mentioned equation (16), that is, the set pressure Pset1_i at which the set pressure locus indicated by line L15 of FIG. 5A is obtained. Moreover, line L21 of FIG. 6B indicates the output of the valve opening. It is assumed that the estimated target valve opening value θse agrees with the ideal target pressure Ps. Accordingly, θse=θs, and the set pressure Pset1_i is equal to the pressure Pr measured. Hence, the pressure deviation ε is zero, and the output Δθ2 of the feedback controller 24 is always zero.

In closed-loop control, the valve opening setting output Δθ1 of the feedforward controller 23 is fixed at the estimated target valve opening value θse. Accordingly, the valve opening setting output θse (=Δθ1+Δθ2) inputted into the motor controller 25 is also θse. The valve opening θr is maintained constant (θse) as in line L21 of FIG. 6B. Moreover, line L20 illustrated in FIG. 6A agrees with line L15 illustrated in FIG. 5A. In other words, in closed-loop control, the set pressure Pset1 that satisfies equation (16) is outputted from the set pressure generator 20. Accordingly, it is possible to quickly converge the pressure Pr of the vacuum chamber 3 to the target pressure Ps with the pressure response (line L20) that does not cause such an overshoot as line L12 of FIG. 5A.

As described above, in the embodiment, the setting is not changed discontinuously (stepwise) to the target pressure Ps at the timing when open-loop control is switched to closed-loop control as in the comparative example illustrated in FIGS. 5A and 5B, but a signal of the set pressure Pset1 of the continuous set pressure locus (line L15 of FIG. 5A) that is a pressure locus substantially by open-loop control alone from the pressure Pr0 at the switching timing to the target pressure Ps is generated, and closed-loop control is performed at the set pressure Pset1. Hence, an overshoot of a pressure response in closed-loop control is prevented, and the pressure regulation time can be reduced.

In the above-mentioned description, the example of the case where the target pressure Ps is higher than the pressure at the start of the pressure regulation (hereinafter referred to as the up case) has been described. However, naturally, the same shall apply to a case where the target pressure Ps is lower than the pressure at the start of the pressure regulation (hereinafter referred to as the down case), and a similar effect can be obtained.

Second Embodiment

Figure 6B:
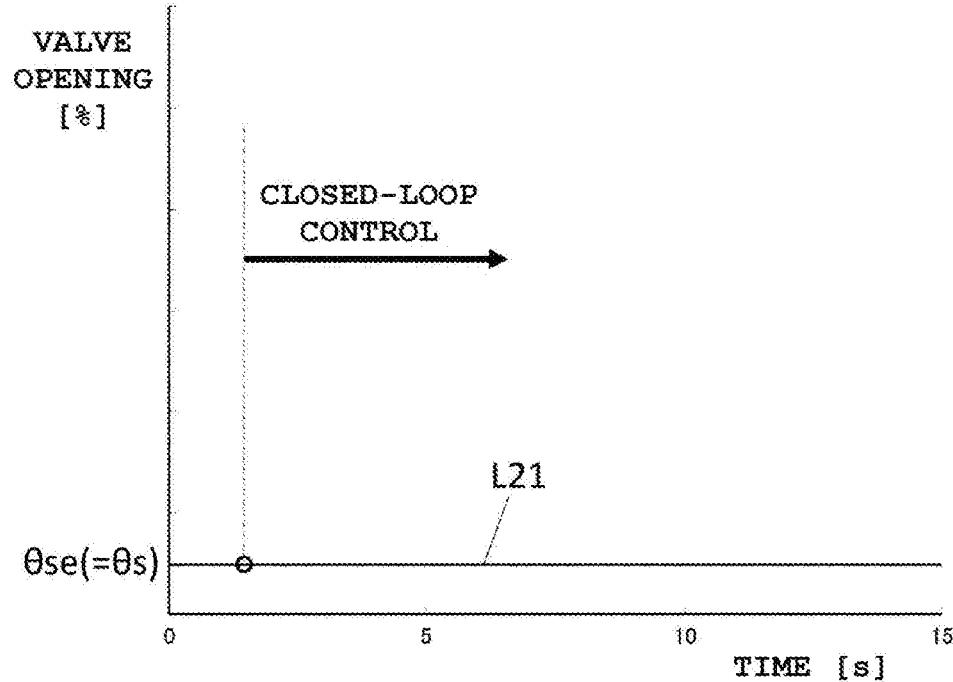

In the examples illustrated with line L15 of FIG. 5A and in FIGS. 6A and 6B in the first embodiment, the ideal case where the final estimated target valve opening value θse in open-loop control agrees with the target valve opening θs has been described. In such a case, line L20 indicating the pressure response agrees with the set pressure locus (line L15 of FIG. 5A) of the set pressure Pset1.

However, there is an error in the estimated target valve opening value θse in reality. If the error is such a large error as cannot be ignored, when the valve opening θr is put in the state of being maintained in the state of the estimated target valve opening value θse, it does not bring a pressure response that converges to the target pressure Ps like line L15 of FIG. 5A, but a pressure response that does not converge to the target pressure Ps like lines L30 and L31 illustrated in FIG. 7. In the case of line L30, the pressure converges to a pressure higher than the target pressure Ps. In the case of line L31, the pressure converges to a pressure lower than the target pressure Ps.

Figure 7:
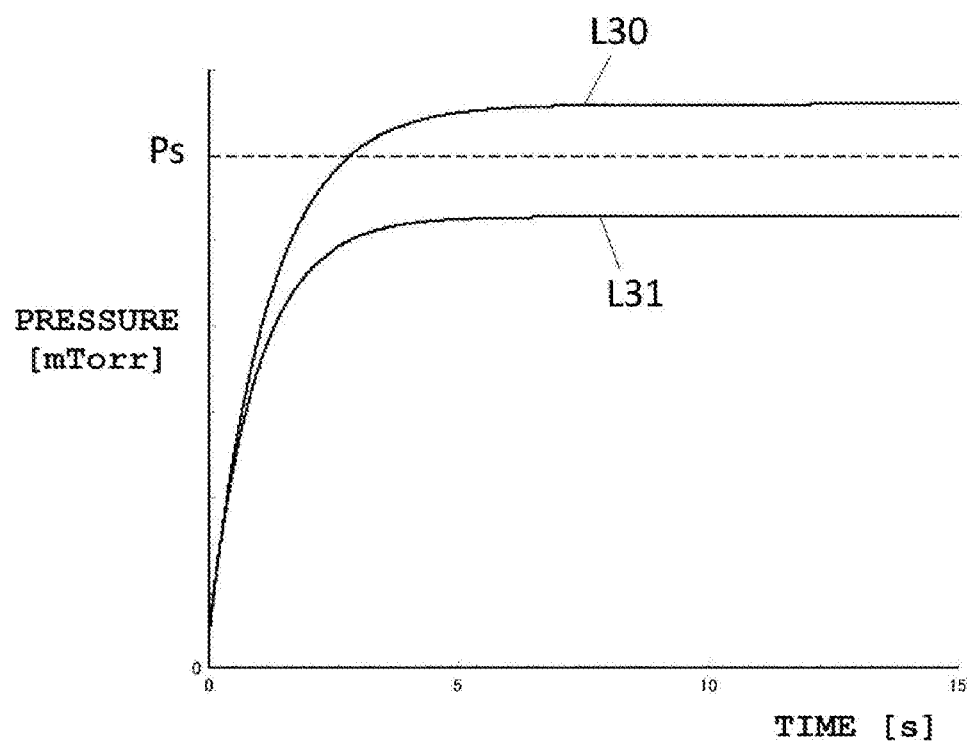
FIG. 7 is a diagram illustrating a pressure response of when the valve opening is maintained at an estimated target valve opening value if there is an error in the estimated target valve opening value.
Figure 8A:
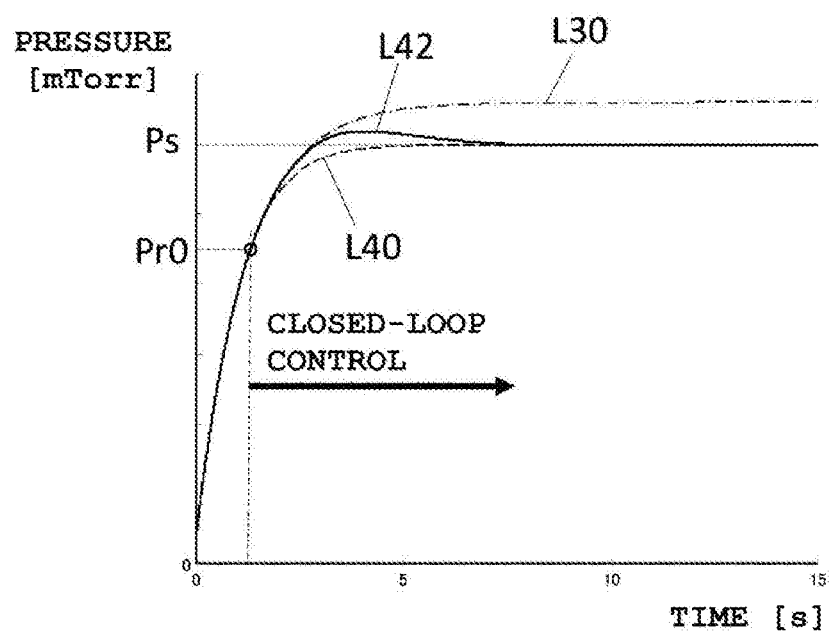
FIGS. 8A and 8B are diagrams illustrating a pressure response of when the set pressure of the first embodiment is applied if there is an error in the estimated target valve opening value.
Figure 8B:
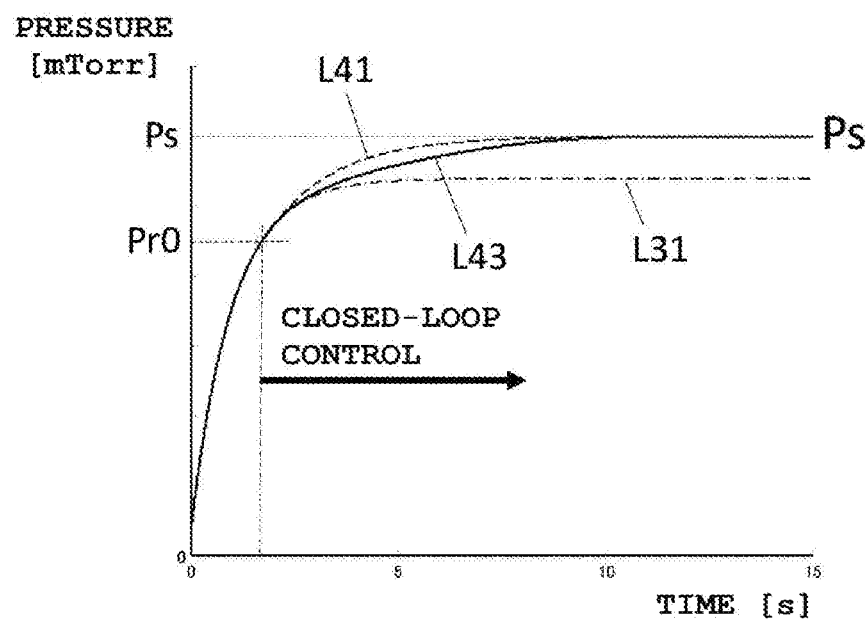

FIGS. 8A and 8B are diagrams illustrating a pressure response of when the set pressure Pset1 of the first embodiment is applied in closed-loop control if a pressure response of when the valve opening θr is maintained at the final estimated target valve opening value θse of open-loop control is lines L30 and L31 of FIG. 7. FIG. 8A illustrates a case of line L30. FIG. 8B illustrates a case of line L31. Line L40 of FIG. 8A indicates a set pressure locus of the set pressure Pset1. Line L42 indicates a pressure response in this case. Moreover, line L41 of FIG. 8B indicates a set pressure locus of the set pressure Pset1. Line L43 indicates a pressure response in this case.

In FIG. 8A, line L40 related to the set pressure Pset1 converges from the pressure Pr0 at the start of closed-loop control to the target pressure Ps. However, an overshoot occurs on line L42 indicating the pressure response. Also in FIG. 8B, line L41 related to the set pressure Pset1 converges from the pressure Pr0 at the start of closed-loop control to the target pressure Ps. However, line L43 indicating the pressure response converges to the target pressure Ps more slowly than line L41, and the pressure regulation time is longer than the ideal case illustrated in FIG. 6A. At the timing when the closed-loop control starts, it is not clear whether the final value of the pressure response at the final valve opening value (the estimated target valve opening value θse) of open-loop control is too high or too low with respect to the target pressure Ps.

Figure 9:
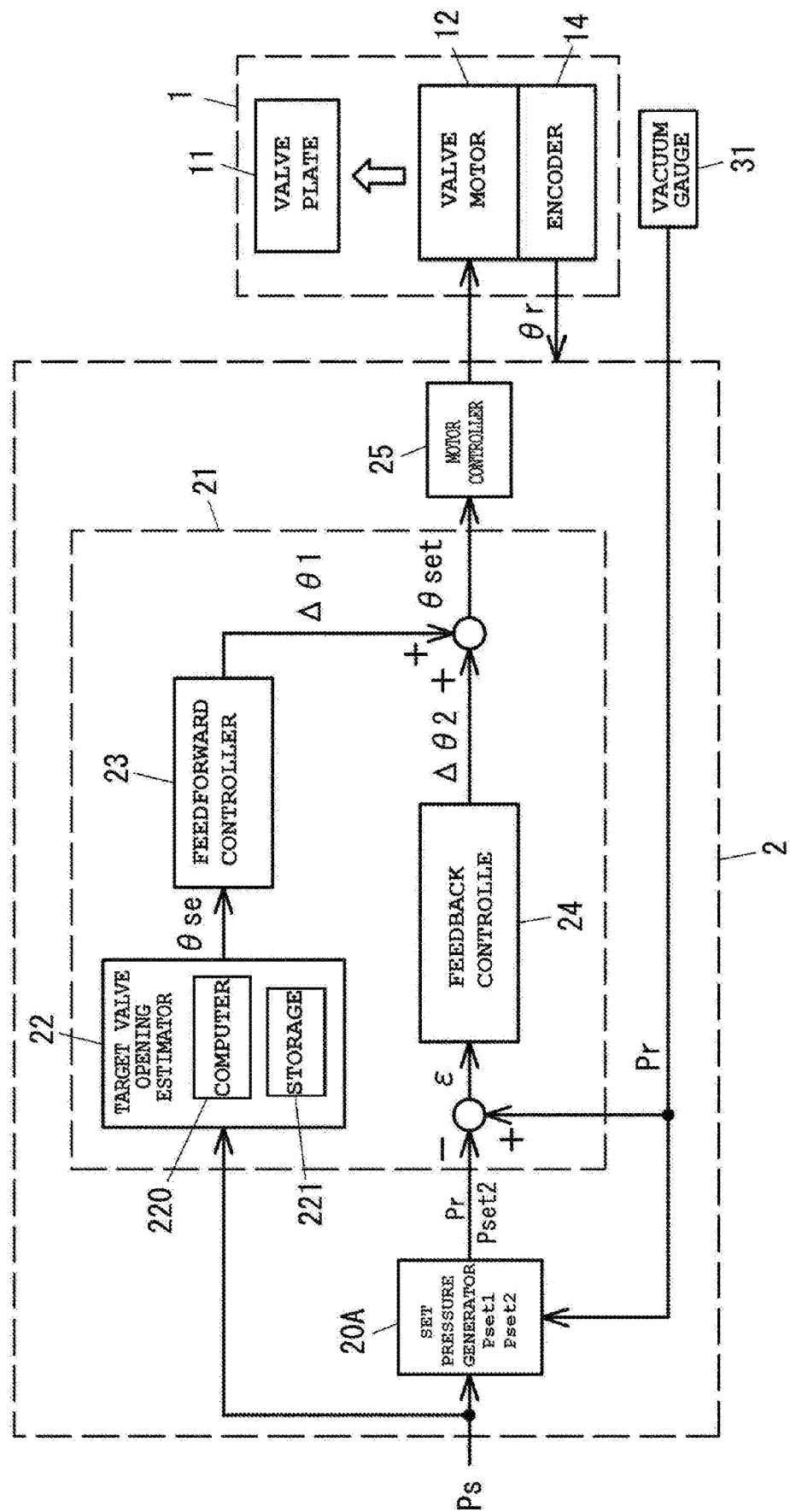
FIG. 9 is a block diagram illustrating the configurations of a vacuum valve and a valve control apparatus in a second embodiment.

Hence, in the second embodiment, it is configured in such a manner as to give a set pressure that can converge appropriately and quickly to the target pressure Ps even if the final estimated target valve opening value θse of open-loop control includes an error. FIG. 9 is a block diagram illustrating the configuration of a valve control apparatus 2 in the second embodiment. The configuration of a set pressure generator 20A is different and the other configurations are similar when compared with the block diagram illustrated in FIG. 3. Different points are mainly described below.

The set pressure generator 20A further generates a second set pressure Pset2 based on the above-mentioned set pressure Pset1, in addition to the set pressure Pset1, on the basis of the inputted target pressure Ps and the pressure Pr. The set pressure generator 20A outputs the pressure Pr as the set pressure in open-loop control in the first stage of the valve opening control and outputs the set pressure Pset2 in closed-loop control.

Method for Calculating Set Pressure Pset2

As described above, at the timing when closed-loop control starts, it is not clear whether the final value of the pressure response with the final valve opening value (the estimated target valve opening value θse) of open-loop control indicated by lines L30 and L31 of FIG. 7 is too high or too low with respect to the target pressure Ps. Hence, in the second embodiment, the set pressure Pset1 is generated under conditions Pr0, (dPr/dt|0) of the timing when closed-loop control starts. The set pressure Pset2 of which locus has been corrected on the basis of the situation after the start of closed-loop control is generated as the set pressure of closed-loop control with reference to the set pressure Pset1. The set pressure Pset2 is set as in the following equation (17). The time constant τ0 is calculated by equation (14).

$$Pset2\_i = A\_i \times Pset2\_i-1 + Ps \times (1-A\_i) \text{ for } i \geq 1 \quad (17)$$

where $A\_i = \exp(-\Delta t \cdot \alpha\_i / \tau 0)$)

In equation (17), in a case of a α_i=1, A_i is the same as A of equation (16), and the set pressure Pset2 agrees with the set pressure Pset1. τ0/α_i corresponds to the time constant related to the set pressure Pset2, if α_i>1, represents the time constant of a set pressure locus that changes more quickly than the case of the time constant τ0 and, if α_i<1, represents the time constant of a set pressure locus that changes more slowly than the case of the time constant τ0. A recurrence relation of the set pressure Pset2 indicated by equation (17) is derived on the basis of the set pressure locus of the pressure response indicated by the following equation (18).

$$Pr\_open = Pr0 \exp(-t \cdot \alpha\_i / \tau 0) + Ps[1 - \exp(-t \cdot \alpha\_i / \tau 0)] \quad (18)$$

α_i is a coefficient value determined every control period Δt, and is set as in the following equations (19a) to (19c), comparing a rate of change ($\Delta Pset1\_i/\Delta t$) at a control timing i of the set pressure Pset1 as the reference and a rate of change ($\Delta Pr\_i/\Delta t$) of the pressure Pr at the control timing i. $\alpha\_0$ in a case of i=0 is $\alpha\_0=1$, and $\Delta\alpha$ is a positive constant.

$$\alpha\_i = \alpha\_i-1-\Delta\alpha \text{ for } |(\Delta Pset1\_i/\Delta t)|<|(\Delta Pr\_i/\Delta t)| \quad (19a)$$

$$\alpha\_i = \alpha\_i-1 \text{ for } |(\Delta Pset1\_i/\Delta t)|=|(\Delta Pr\_i/\Delta t)| \quad (19b)$$

$$\alpha\_i = \alpha\_i-1+\Delta\alpha \text{ for } |(\Delta Pset1\_i/\Delta t)|>|(\Delta Pr\_i/\Delta t)| \quad (19c)$$

Figure 10:
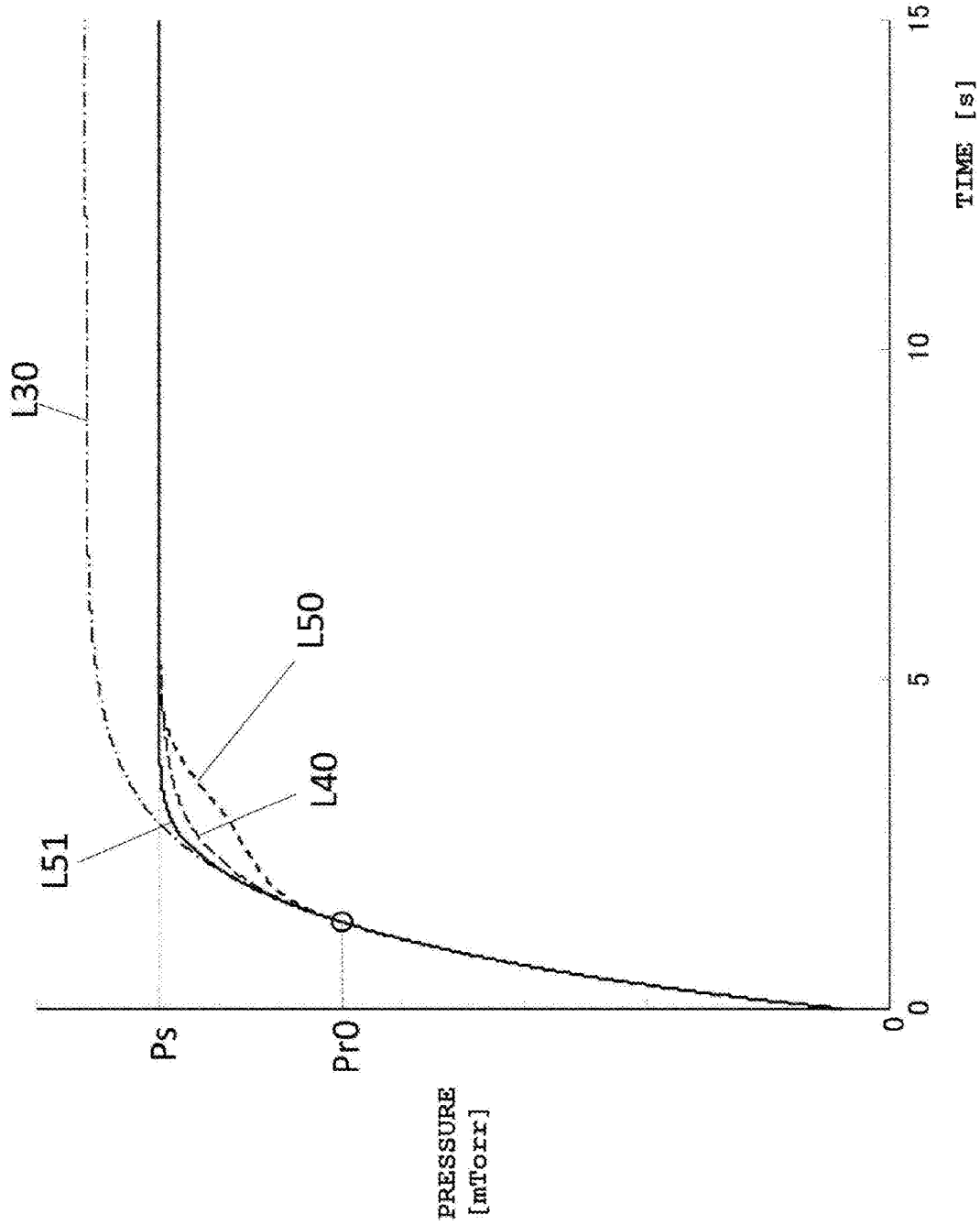
FIG. 10 is a diagram illustrating an example of a pressure response in the second embodiment.

Equation (19a) is a case where the rate of change of the actual pressure Pr is greater than the rate of change of the set pressure Pset1, and corresponds to, for example, lines L40 and L30 of FIG. 8A. In this case, $\alpha\_i<1$ is set, and the time constant ($\tau 0/\alpha\_i$) is set to be greater than $\tau 0$. FIG. 10 is a diagram illustrating lines L40 and L30 illustrated in FIG. 8A, and a set pressure locus (line L50) of the set pressure Pset2 and a pressure response (line L51) in a case of using the set pressure Pset2. $\alpha\_i<1$ is set to correct the set pressure locus (line L50) of the set pressure Pset2 to the low pressure side with respect to the set pressure locus (line L40) of the set pressure Pset1, and is brought close to the target pressure Ps more slowly than line L40. As a result, the pressure response (line L51) converges to the target pressure Ps substantially without an overshoot.

Figure 11:
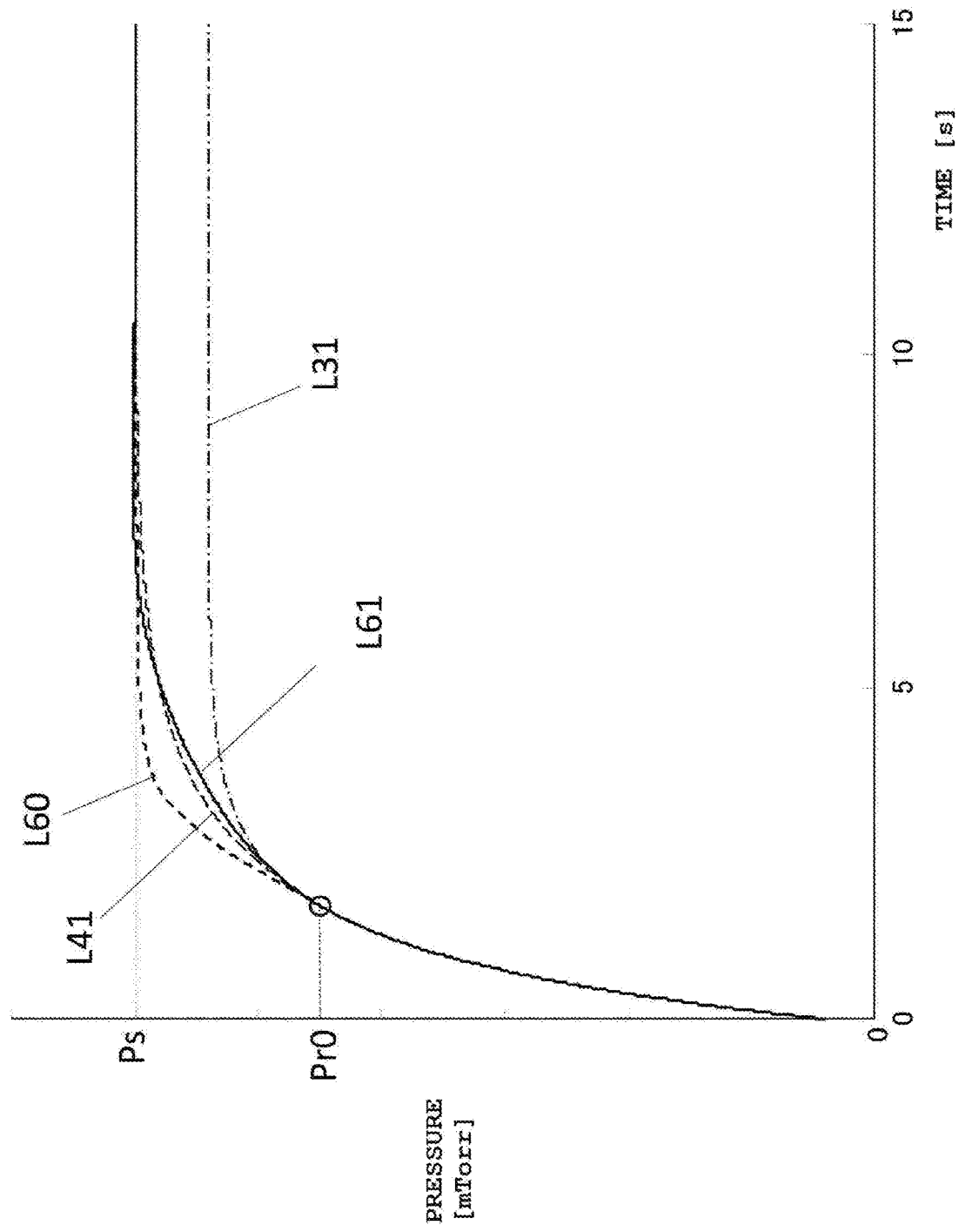
FIG. 11 is a diagram illustrating another example of the pressure response in the second embodiment.

Equation (19c) is a case where the rate of change of the actual pressure Pr is less than the rate of change of the set pressure Pset1, and corresponds to, for example, lines L41 and L31 of FIG. 8B. In this case, $\alpha\_i>1$ is set, and the time constant ($\tau 0/\alpha\_i$) is set to be less than $\tau 0$. FIG. 11 is a diagram illustrating lines L41 and L31 illustrated in FIG. 8B, and a set pressure locus (line L60) of the set pressure Pset2 and a pressure response (line L61) in the case of using the set pressure Pset2. $\alpha\_i>1$ is set to correct the set pressure locus (line L60) of the set pressure Pset2 to the high pressure side with respect to the set pressure locus (line L41) of the set pressure Pset1, and is brought close to the target pressure Ps more quickly than line L41. As a result, the pressure response (line L61) converges to the target pressure Ps more quickly than the pressure response (line L43) of FIG. 8B.

The following first and second modifications can be applied to the above-mentioned first and second embodiments.

First Modification

If the pressure Pr0 at the timing when closed-loop control starts is increased as compared to the target pressure Ps in the case of the up case, or is reduced as compared to the target pressure Ps in the case of the down case, due to an error in the estimated target valve opening value $\theta$se or a disturbance, the time constant $\tau 0$ calculated by equation (14) has a minus value. In this case, the set pressure Pset1 results in being set in a direction deviating from the target pressure Ps, which results in increasing the pressure regulation time.

Hence, in the first modification, instead of equation (14), the following equation (20) is used to calculate the time constant $\tau 0$.

$$\tau 0 = |Ps-Pr0|/|(dPr/dt|0)| \quad (20)$$

The time constant $\tau 0$ is calculated by equation (20). Accordingly, even if an irregularity occurs in the timing when closed-loop control starts, the time constant always has a plus value, and the appropriate set pressure Pset1 is outputted and the reliability of pressure regulation improves.

Second Modification

The second modification is a countermeasure in a case where there is a tendency in the target valve opening estimator 22 to calculate the estimated target valve opening value $\theta$se at which a virtual response in open-loop control becomes like line L30 (or line L31) of FIG. 7. If there is such an erroneous calculation tendency, considering such a tendency in advance, the set pressure Pset1 in the above-mentioned first and second embodiments may be calculated by the following equation (21) where A of equation (16) is rewritten into A2.

$$Pset1\_i = A2 \times Pset1\_i-1 + Ps \times (1-A2) \text{ for } i \geq 1 \quad (21)$$

where $A2=\exp(-\Delta t\cdot\beta/\tau 0)$ and $\beta \neq 1$.

A recurrence relation of the set pressure Pset1 indicated by equation (21) is also derived on the basis of the set pressure locus of a pressure response indicated by the following equation (22) as in the case of the recurrence relation of the set pressure Pset2 indicated by equation (17).

$$Pr\_open = Pr0 \exp(-t\cdot\beta/\tau 0) + Ps[1-\exp(-t\cdot\beta/\tau 0)] \quad (22)$$

If it is known beforehand that the tendency that the virtual response exceeds the target pressure Ps as in line L30 of FIG. 7 is strong, $\beta<1$ is set. As a result, the gradient of the set pressure locus of the set pressure Pset1 is set to be moderately low, and overshoots are reduced. Conversely, if it is known beforehand that the tendency that the virtual response falls below the target pressure Ps as in line L31 of FIG. 7 is strong, $\beta>1$ is set. As a result, the gradient of the set pressure locus of the set pressure Pset1 is set to be moderately high, and convergence readiness is improved.

The operations and effects of the above-mentioned embodiments and modifications are summarized as follows: (1) As described in the first embodiment, the valve control apparatus 2 of FIG. 3 includes the set pressure generator 20 that generates the first set pressure Pset1, and the valve opening controller 21 that performs open-loop control being the first valve opening control on the basis of the target pressure Ps and, after the first valve opening control, performs the second valve opening control that performs feedback control on the basis of the difference $\varepsilon$ between the set pressure Pset1 and the pressure Pr of the vacuum chamber 3. The set pressure generator 20 generates the set pressure Pset1 on the basis of the set pressure locus that converges from the pressure Pr0 of the vacuum chamber 3 at the time of switching from the first valve opening control to the second valve opening control to the target pressure Ps with the predetermined time constant $\tau 0$, for example, the set pressure locus indicated by line L15 of FIG. 5A.

It is configured in this manner that the set pressure Pset1 in the second valve opening control is generated on the basis of the set pressure locus that converges from the pressure Pr0 of the vacuum chamber 3 at the time of switching to the second valve opening control to the target pressure Ps with the predetermined time constant $\tau 0$. Accordingly, an overshoot of the pressure response after switching to closed-loop control indicated by line L12 of FIG. 5A can be prevented, and the pressure regulation time can be reduced.

In the above-mentioned embodiments, the case where the first valve opening control is open-loop control (feedforward control) has been described as an example. However, the first valve opening control is not limited to open-loop control. For example, also if feedback control of coarse adjustments is performed in the first valve opening control and feedback control of fine adjustments is performed in the second valve opening control, such a set pressure Pset1 described above can be applied.

(2) It is preferable that the above-mentioned predetermined time constant τ0 be calculated on the basis of, for example, the pressure Pr (=Pr0) of the vacuum chamber 3 at the time of switching from the first valve opening control to the second valve opening control and the time derivative value (dPr/dt|0) of the pressure Pr, and the target pressure Ps. Consequently, it is possible to make the set pressure locus in the second valve opening control (that is, the set pressure locus indicated by equation (15)) substantially the same as the pressure locus by open-loop control alone.

(3) Furthermore, as in the second embodiment, the time constant τ0 of a first set pressure locus related to the set pressure Pset1 (that is, the set pressure locus indicated by equation (15)) is corrected to, for example, (τ0/α_i) every control period Δt, applying equations (19a) to (19c), in other words, on the basis of a change in the set pressure Pset1 over time and a change in the pressure Pr of the vacuum chamber 3 over time, and the second set pressure Pset2 is generated on the basis of a second set pressure locus that converges to the target pressure Ps with the corrected time constant (τ0/α_i) (that is, the set pressure locus indicated by equation (18)). It is preferable that instead of the second valve opening control using the set pressure Pset1, third valve opening control that performs feedback control on the basis of a difference ε between the set pressure Pset2 and the pressure Pr of the vacuum chamber 3 be performed.

When an error occurs in the final valve opening value (the estimated target valve opening value θse) in open-loop control (the first valve opening control), even if the valve opening is controlled on the basis of the set pressure Pset1 as in lines L40 and L41 of FIGS. 8A and 8B, an overshoot occurs as in line L42, or the speed to converge to the target pressure Ps reduces as in line L43. However, if there is a possibility of an overshoot due to the above-mentioned third valve opening control, the set pressure Pset2 is set to be moderately lower than the set pressure Pset1 as in line L50 of FIG. 10. Conversely, if there is a possibility of a reduction in convergence speed, the set pressure Pset2 is set to be moderately higher than the set pressure Pset1 as in line L60 of FIG. 11. As a result, the pressure Pr results in converging to the target pressure Ps more quickly.

(4) It is preferable that the above-mentioned corrected time constant (τ0/α_i) be set to be less than the time constant τ0 if the magnitude of the change in the set pressure Pset1 over time is less than the magnitude of the change in the pressure Pr of the vacuum chamber 3 over time as in equation (19a), be set to be greater than the time constant τ0 if the magnitude of the change in the set pressure Pset1 over time is greater than the magnitude of the change in the pressure Pr of the vacuum chamber 3 over time, and be set to be equal to the time constant τ0 if the magnitude of the change in the set pressure Pset1 over time is equal to the magnitude of the change in the pressure Pr of the vacuum chamber 3 over time.

(5) Furthermore, it is preferable that the time constant τ0 be calculated by an equation "τ0=|(Ps−Pr0)|/|(dPr/dt|0)|". As a result, even if an irregularity occurs in the timing when closed-loop control starts, the time constant τ0 always has a plus value, the appropriate set pressure Pset1 is outputted, and the reliability of pressure regulation improves.

(6) Moreover, it is preferable that if a control error in the first valve opening control (open-loop control) is known beforehand, the time constant (τ0/β) obtained by correcting the time constant τ0 on the basis of the control error be used instead of the time constant τ0 to generate the first set pressure Pset1 on the basis of the set pressure locus that converges to the pressure Pr of the vacuum chamber 3 with the corrected time constant (τ0/β) (the set pressure locus indicated by equation (22)). As a result, the influence of the control error in the first valve opening control can be reduced.

Various embodiments and modifications have been described above. However, the present invention is not limited to these contents. Other aspects that are conceivable within the scope of the technical idea of the present invention are also included within the scope of the present invention. For example, the vacuum valve 1 where the valve plate 11 is driven and swung to change the valve opening has been described as an example. However, the present invention can also be applied similarly to an automatic pressure regulating vacuum valve of another configuration.

What is claimed is:

1. A valve control apparatus that performs first valve opening control and second valve opening control in succession on a vacuum valve between a vacuum chamber and a vacuum pump, and controls a chamber pressure of the vacuum chamber to a target pressure, the valve control apparatus comprising:
    a generator configured to generate a first set pressure signal; and
    a valve opening controller configured to perform the first valve opening control on the basis of the target pressure and, after the first valve opening control, perform the second valve opening control performing feedback control on the basis of a difference between the first set pressure signal and the chamber pressure, wherein
    the generator generates the first set pressure signal on the basis of a first set pressure locus converging from the chamber pressure at the time of switching from the first valve opening control to the second valve opening control to the target pressure with a time constant.

2. The valve control apparatus according to claim 1, wherein the time constant is calculated on the basis of the chamber pressure at the time of the switching and a time derivative value of the chamber pressure, and the target pressure.

3. The valve control apparatus according to claim 1, wherein
    the generator
        corrects the time constant of the first set pressure locus every control period on the basis of a change in the first set pressure signal over time and a change in the chamber pressure over time, and
        generates a second set pressure signal on the basis of a second set pressure locus converging to the target pressure with the corrected time constant, and
    the valve opening controller performs third valve opening control performing feedback control, instead of the second valve opening control, on the basis of a difference between the second set pressure signal and the chamber pressure.

4. The valve control apparatus according to claim 3, wherein the corrected time constant is set to
    be less than the time constant before the correction upon the magnitude of the change in the first set pressure signal over time being less than the magnitude of the change in the chamber pressure over time,
    be greater than the time constant before the correction upon the magnitude of the change in the first set pressure signal over time being greater than the magnitude of the change in the chamber pressure over time, and be equal to the time constant before the correction upon the magnitude of the change in the first set pressure signal over time being equal to the magnitude of the change in the chamber pressure over time.

5. The valve control apparatus according to claim 1, wherein the time constant is calculated by an equation "$|(Ps-Pr0)|/|(dPr/dt|0)|$" where the target pressure is Ps, the chamber pressure is Pr, and the chamber pressure at the time of the switching is Pr0.

6. The valve control apparatus according to claim 1, wherein the generator, in a case where a control error in the first valve opening control is known, uses a corrected time constant obtained by correcting the time constant on the basis of the control error in the first valve opening control, instead of using the time constant, and generates the first set pressure signal on the basis of a set pressure locus converging to the target pressure with the corrected time constant.

7. A vacuum valve comprising:

a disc;

a disc driver configured to drive the disc to open and close the disc; and the valve control apparatus according to claim 1 configured to control the opening and closing drive by the disc driver.

* * * * *